(12) United States Patent
Woodruff et al.

(10) Patent No.: US 6,490,091 B1
(45) Date of Patent: Dec. 3, 2002

(54) DISPLAY PANEL FILTER AND METHOD OF MAKING THE SAME

(75) Inventors: Daniel P. Woodruff, Lakeville; Chad J. Carter; Joseph W. Chavis, both of Faribault, all of MN (US)

(73) Assignee: Viratec Thin Films, Inc., Faribault, MN (US)

( * ) Notice: Subject to any disclaimer, the term of this patent is extended or adjusted under 35 U.S.C. 154(b) by 0 days.

(21) Appl. No.: 09/487,038

(22) Filed: Jan. 19, 2000

Related U.S. Application Data

(60) Provisional application No. 60/116,562, filed on Jan. 21, 1999.

(51) Int. Cl.[7] .................................................. G02B 5/28
(52) U.S. Cl. ........................ 359/585; 359/582; 359/586; 359/589; 428/216
(58) Field of Search .................................. 359/585, 580, 359/588; 428/216, 209, 582, 586

(56) References Cited

U.S. PATENT DOCUMENTS

| | | | |
|---|---|---|---|
| 3,977,905 A | * | 8/1976 | Revesz et al. ................. 136/89 |
| 4,412,255 A | | 10/1983 | Kuhlman et al. |
| 4,462,883 A | | 7/1984 | Hart |
| 4,710,669 A | | 12/1987 | Adamski et al. |
| 4,799,745 A | | 1/1989 | Meyer et al. |
| 4,910,090 A | | 3/1990 | Kuhlman et al. |
| 5,106,671 A | | 4/1992 | Amberger et al. |
| 5,110,662 A | | 5/1992 | Depauw et al. |
| 5,147,694 A | | 9/1992 | Clarke |
| 5,183,700 A | | 2/1993 | Austin |
| 5,372,874 A | | 12/1994 | Dickey et al. |
| 5,377,045 A | | 12/1994 | Wolfe et al. |
| 5,398,046 A | | 3/1995 | Szegedi et al. |
| 5,486,847 A | | 1/1996 | Ranf et al. |
| 5,539,275 A | | 7/1996 | Arimoto et al. |
| 5,595,825 A | | 1/1997 | Guiselin |
| 5,804,102 A | | 9/1998 | Oi et al. |
| 5,811,923 A | | 9/1998 | Zieba et al. |
| 5,834,103 A | * | 11/1998 | Bond et al. ................. 428/216 |
| 5,874,801 A | | 2/1999 | Kobayashi et al. |
| 6,104,530 A | | 8/2000 | Okamura et al. |

FOREIGN PATENT DOCUMENTS

| | | |
|---|---|---|
| EP | 0299607 | 5/1988 |
| WO | 9828678 | 9/1997 |

* cited by examiner

Primary Examiner—Jon Henry
(74) Attorney, Agent, or Firm—Dorsey & Whitney LLP

(57) ABSTRACT

The present invention provides a device in the form of a filter which is useable in conjunction with a plasma display panel and which functions to reduce reflection after assembly to acceptable levels, to increase contrast enhancement ratios, to reduce EMI emissions to levels which comply with consumer safety and other regulations and standards and to reduce infrared transmission in the 800 nm–1000 nm range to a level which does not interfere with IR remote control operation. The present invention also relates to a method of making such a plasma display panel filter.

26 Claims, 6 Drawing Sheets

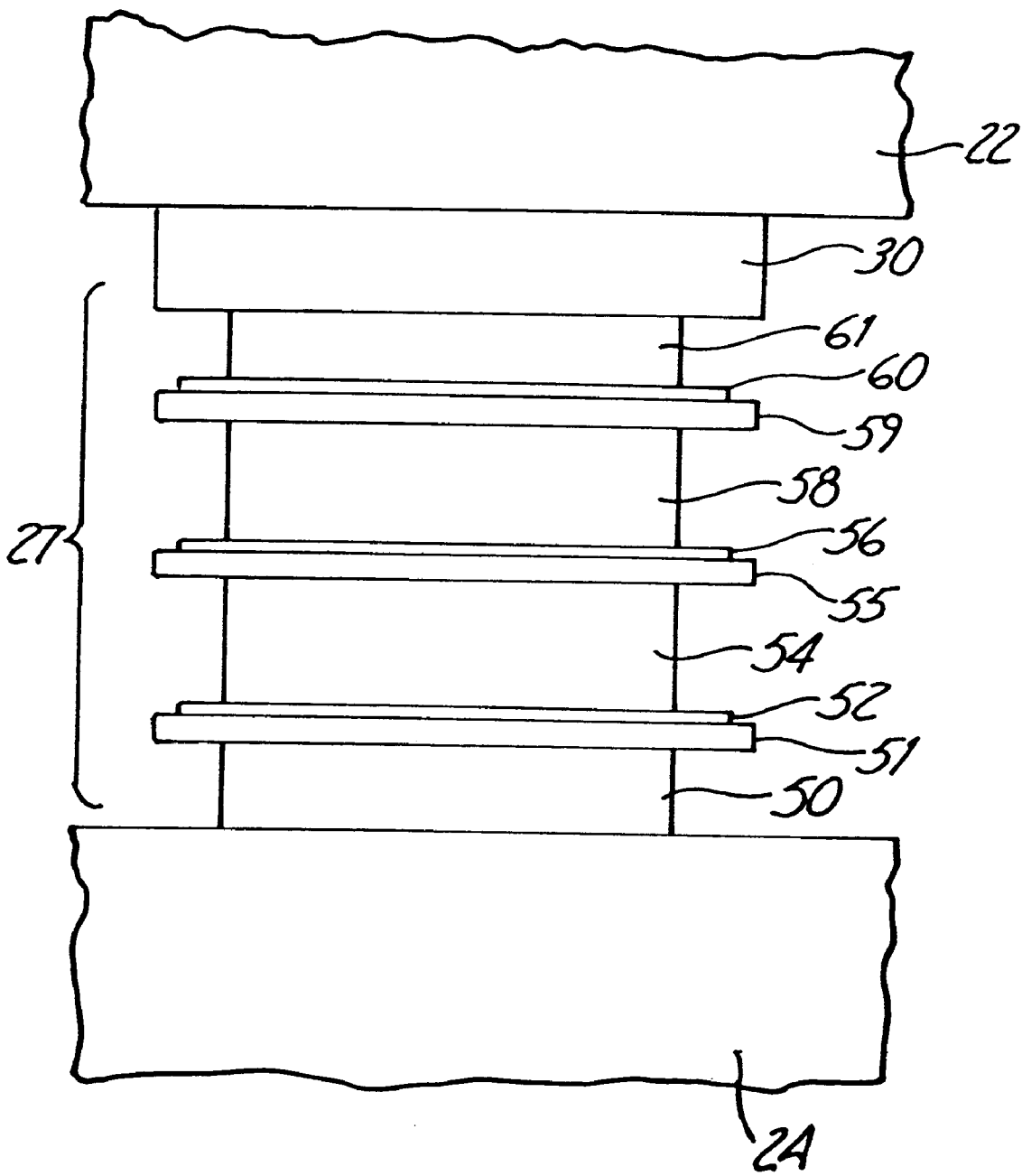

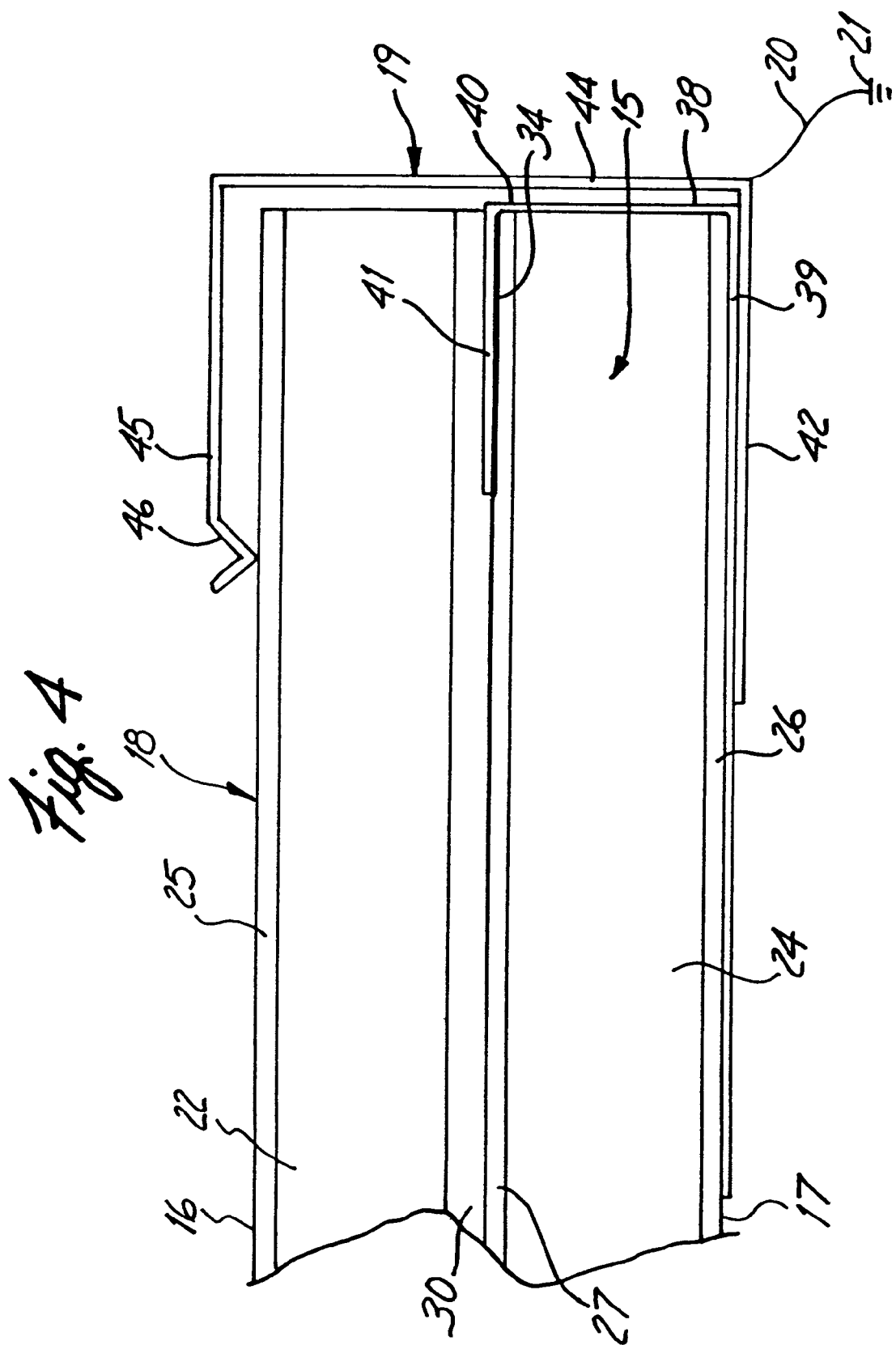

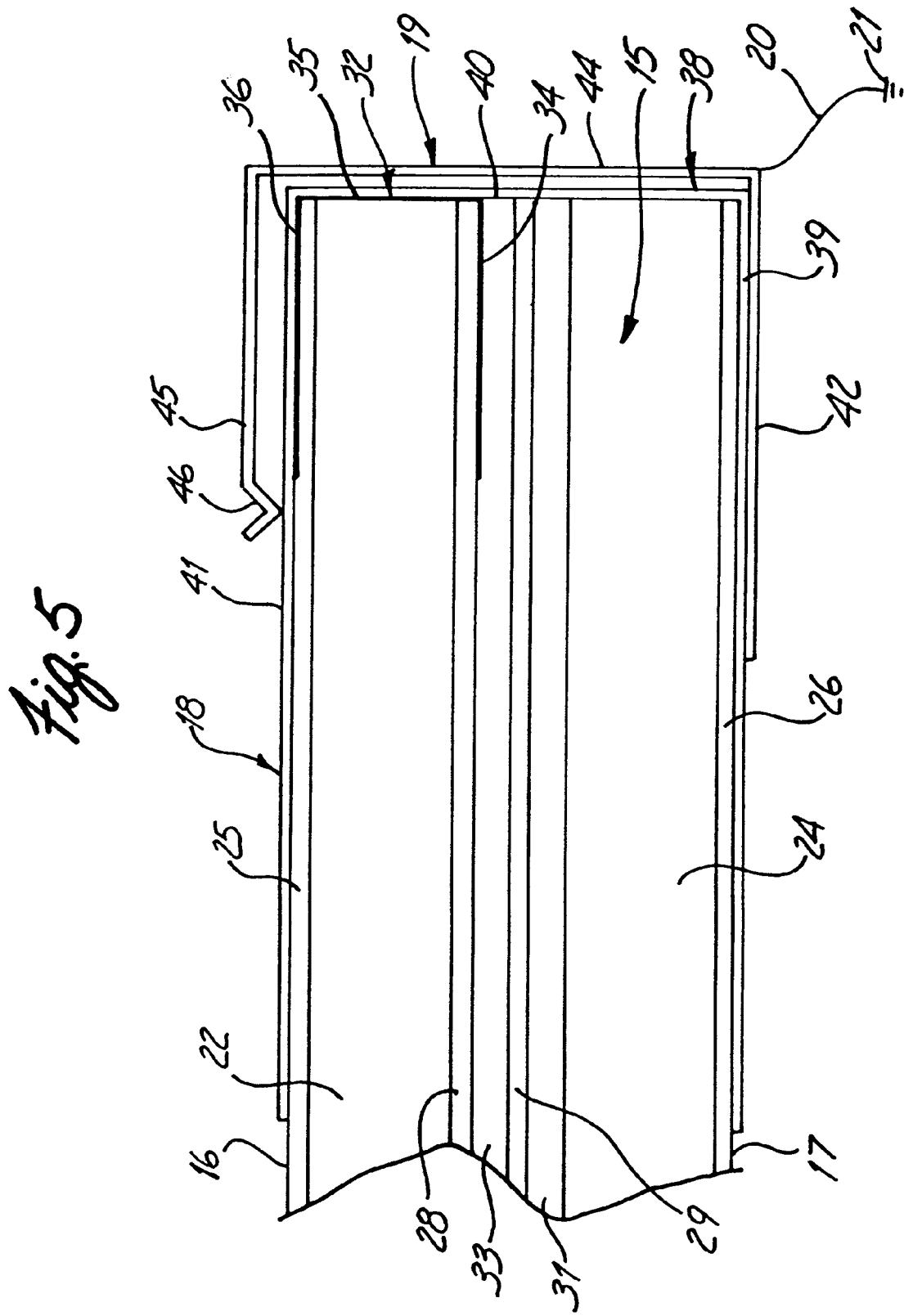

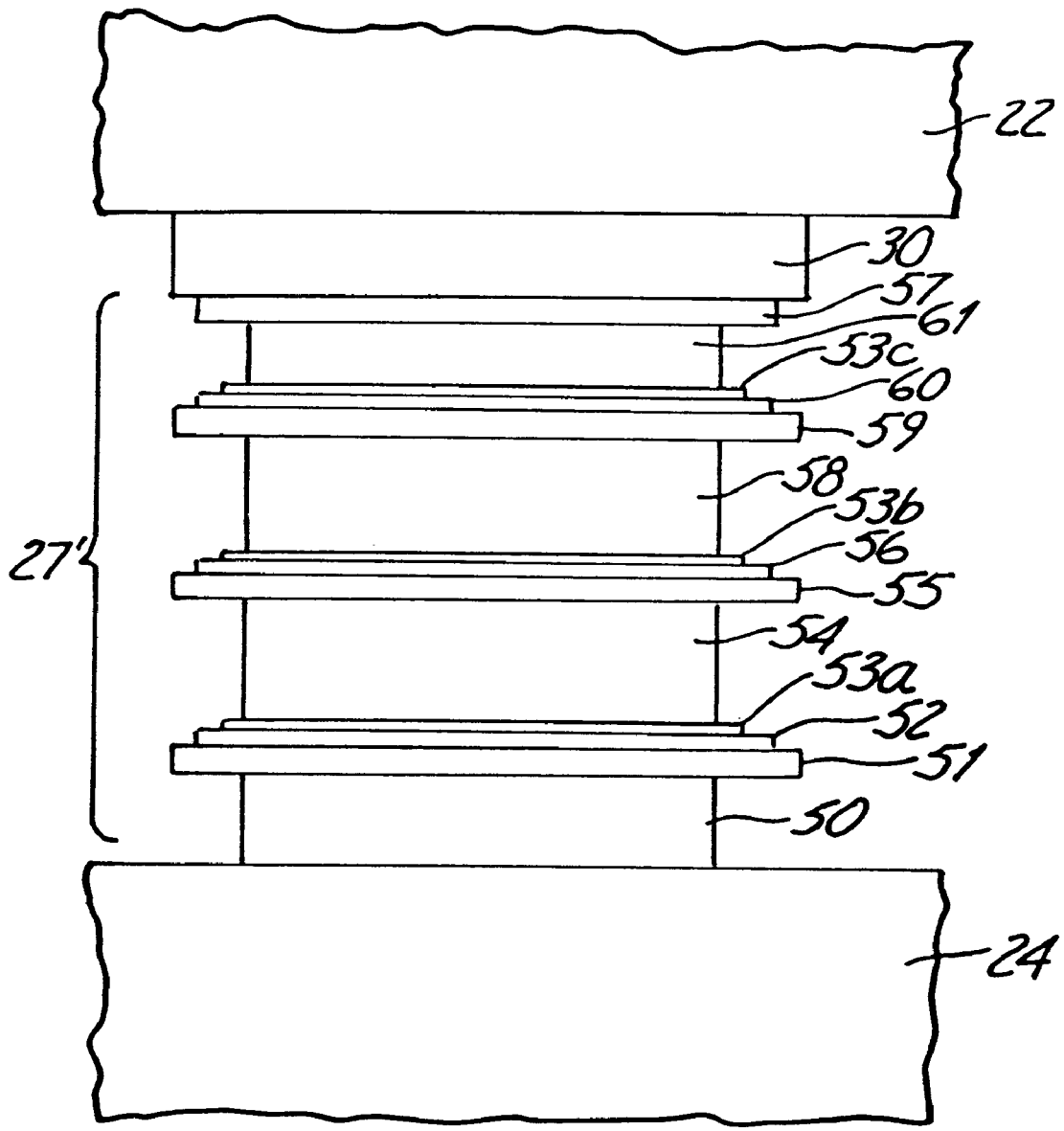

DISPLAY PANEL FILTER AND METHOD OF MAKING THE SAME

This application claims the benefit of Provisional Application Ser. No. 60/116,562, filed Jan. 21, 1999.

FIELD OF THE INVENTION

The present invention relates generally to a display panel filter, and more particularly to a filter having particular application for use with a plasma display panel or flat panel display. The present invention also relates to an IR/EMI filter film applied to a substrate for use in a display panel filter or otherwise and a method of making such a film and a display panel filter.

DESCRIPTION OF THE PRIOR ART

Visual display panels commonly known as plasma display panels or flat panel displays have been recently introduced for the purpose of displaying visual images or information on relatively large, flat screens. Plasma display panel technology utilizes selectively energized gas ions to bombard phosphors on a display screen, similar to an electron beam bombarding phosphors on a cathode ray tube (CRT) screen. Plasma display panels are similar to CRT displays in that both provide a means for visually displaying information or images from an input signal; however, important differences exist. First, a CRT display requires a significant depth dimension relative to the size of its display screen to accommodate a generally funnel shaped rearward portion for generation and deflection of the electron beam. Second, most CRT screens are curved. In contrast, the energization of the ions in a display panel using plasma display technology occurs in a relatively thin vacuum chamber adjacent to the display screen, resulting in a relatively thin display panel with a flat view face. Thus, plasma display panels are currently used primarily for relatively large display panels where CRTs are impractical or where a display panel with a significantly reduced depth dimension is necessary or desirable.

Although plasma display panels provide significant advantages and improvements by facilitating relatively large visual displays with a reduced panel depth and by otherwise facilitating the use of displays in environments with space restrictions which preclude the use of conventional CRT displays, new problems have arisen. These problems relate to the quality of the visual display, increased infrared (IR) and electromagnetic interference (EMI) emissions, low contrast ratio and consumer safety issues. For example, photopic reflection from many plasma display panels is in excess of 15%. This adversely affects the quality of the display. Further, operation of the plasma display panel produces or has the potential of producing infrared (IR) emissions which are capable in some cases of interfering with a remote control of the panel or other devices utilizing infrared signaling. Still further, operation of the plasma display panel results in the generation and emission of electromagnetic interference (EMI). Accordingly, many plasma panel displays fail to meet governmental TCO and FCC requirements for EMI emissions and the stricter standards for various military, aircraft and other uses. The above problems necessary limit the applicability and desirability of using plasma display panels.

Accordingly, there is a critical need in the art for a device or a filter, and in particular a multi-layer filter film, useable in conjunction with plasma display panels for addressing and solving the above problems and limitations. A need also exists for a method of making such a device, filter or film.

SUMMARY OF THE INVENTION

To satisfy the need in the art, the present invention provides a device in the form of a single filter which is useable in conjunction with plasma display panels or other applications and which functions to reduce reflection after assembly to acceptable levels, to increase contrast enhancement, to maintain transmission integrity, to assist in reducing EMI emissions to levels which comply not only with consumer safety regulations, but with the stricter military and aircraft standards, and to reduce infrared emissions in the 800 nm–1000 nm range to a level which does not interfere with remote control operation.

Generally, the present invention comprises a substrate with a filter film (preferably an IR/EMI shielding film) applied thereto for use in a display panel filter. One embodiment of a filter device in accordance with the invention includes a filter film comprised of one or more conductive layers and one or more dielectric layers applied to a substrate which is then laminated to a second substrate. This second substrate may comprise a piece of transparent glass, plastic or other material, a flexible film such as PET film or the front face of the display device itself. The combination of the conductive and dielectric layers functions to provide the desired EMI and IR shielding and assists in reducing reflection and increasing contrast enhancement. This combination of layers may be provided as a single film containing both conductive and dielectric layers. Because lamination of the substrates necessarily requires use of an adhesive or other bonding agent and exposure of the same to at least one surface of the shielding film or filter, a layer of silicon dioxide ($SiO_2$) or other material may be applied to the filter or film, if desired, to improve compatibility with and/or limit possible reactions between the outer layer of the filter or film and the adhesive. The outer surfaces of one or both substrates is also preferably an anti-reflective (AR) coating. The filter further includes an electrical connection member electrically connected to conductive layers within the EMI/IR shielding film. Grounding means is also provided in the form of an electrical wire or the like for electrically connecting the electrical connection member to a grounded terminal. Other means, however, may also be utilized.

The preferred embodiment of the shielding film comprises one or more layers of a conductive material and one or more alternating layers of a dielectric. The conductive material may include various conductive metals or other materials such as silver, copper, gold and indium tin oxide, among others, although silver metal is preferred. The dielectric may include various materials such as niobium pentoxide, titanium dioxide and tin oxide, among others, although niobium pentoxide is preferred. Additionally, a thin protective layer is provided between adjacent conductive/dielectric layers to eliminate or limit undesirable oxidation or other deterioration of the conductive layer during formation of the film or otherwise. Such a protective layer is desirable when the conductive layer is subject to oxidation or other deterioration and/or the manufacturing conditions result in the film being exposed to high temperatures. Such conditions exist when the film is manufactured using sputtering or various other thin film deposition techniques, particularly for multiple layer films of two or more conductive material layers. In some cases, the protective layer is comprised of two or more layers of different materials.

In the preferred embodiment, the transparent substrates comprise view side and panel side substrates with the panel side substrate being the substrate closest to, or adjacent to, the display screen. Similarly, each of the substrates includes a view side facing away from the display screen and a panel side facing the display screen. In the preferred embodiment, the EMI/IR shielding film or filter is applied directly to the view side of the panel side substrate and the two substrates are laminated together by a urethane or other adhesive. The preferred embodiment further includes an environmental degradation barrier for the conductive layers within the EMI/IR shielding layer. This barrier extends around the edge of the laminated filter and is constructed of a conductive material. This barrier is electrically connected both with the electrical connection member or busbar and with a grounding terminal.

The method aspect of the present invention relates to a method of making a film or filter of the type described above for use in conjunction with a plasma display panel. Such method generally includes providing a transparent substrate, applying an EMI/IR shielding film or filter to such substrate and then laminating such substrate to a second substrate.

Accordingly, an object of present invention is to provide a film or filter for use in conjunction with a plasma display panel.

Another object of the present invention is to provide a plasma display panel filter which provides anti-reflective, EMI shielding, contrast enhancement and infrared shielding capabilities and which also complies with consumer safety requirements.

A further object of the present invention is to provide a plasma display panel filter having one or more conductive layers and one or more dielectric layers formed on a transparent substrate for subsequent lamination to a second substrate.

A still further object of the present invention is to provide a plasma display panel filter with an improved film providing both EMI and IR shielding capabilities.

A further object of the present invention is to provide a plasma display panel filter with an improved means for electrically connecting the EMI shielding layer to a grounding terminal.

A still further object of the present invention is to provide a plasma display panel filter with an electrically conductive material around the edge of the filter to prevent environmental degradation of the EMI shielding layer and to maximize the EMI shielding efficiency of such layer.

A still further object of the present invention is to provide a plasma display panel as described above which includes a layer to prevent or minimize possible reactions between the lamination adhesive and the shielding film and/or to improve compatibility with the adhesive and promote the adhesive strength.

Another object of the present invention is to provide a method of making a film and plasma display panel filter of the type described above.

These and other objects of the present invention will become apparent with reference to the drawings, the description of the preferred embodiment and method and the appended claims.

BRIEF DESCRIPTION OF THE DRAWINGS

FIG. 3 is a schematic sectional view of the EMI/IR shielding film in accordance with the present invention.

FIG. 4 is a view similar to that of FIG. 2 of a further plasma display panel filter.

FIG. 5 is an enlarged view, partially in section, and similar to that of FIG. 2, of a further embodiment of a plasma display panel filter.

FIG. 6 schematic sectional view of a further embodiment of the shielding film in accordance with the present invention.

DESCRIPTION OF THE PREFERRED EMBODIMENT AND METHOD

The present invention relates to a plasma display panel filter, or shielding film for use therein, which functions to provide EMI and IR shielding capabilities. Preferably the filter also provides anti-reflective (AR) capability. Various features of the present invention have possible application other than for display panel filters. However, the description of the preferred embodiment will be for use in a plasma display panel filter.

Figure 1:
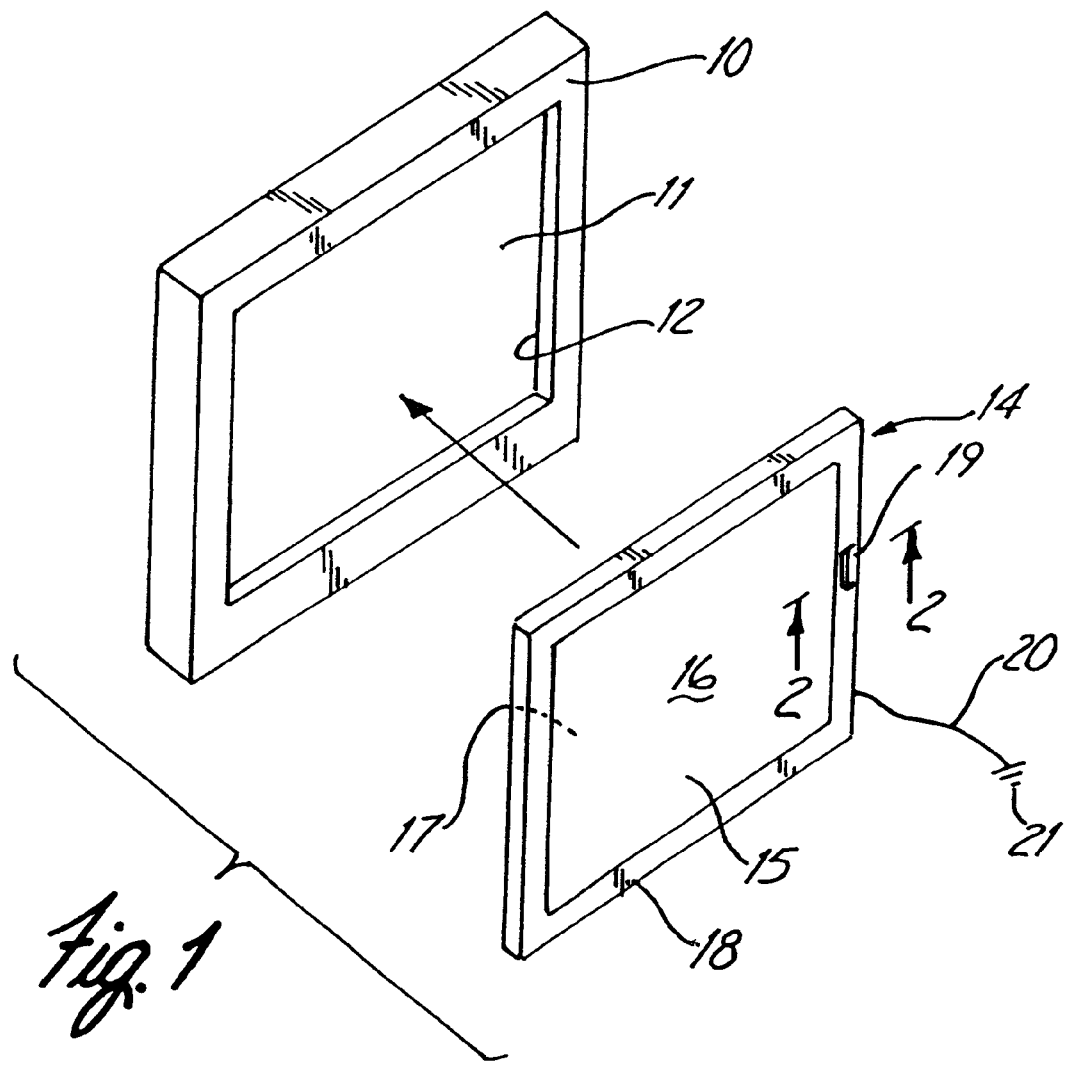
FIG. 1 is an isometric, exploded view of a plasma display panel and associated filter in accordance with the present invention.

Reference is first made to FIG. 1 illustrating an exploded, isometric view of a plasma display panel 10 and associated filter 14. in accordance with the present invention. The display panel 10 as illustrated in FIG. 1 in accordance with the preferred embodiment is a generally rectangular configured device having a front viewing or display screen 11 and a recessed area 12 for receiving a display panel filter 14. It should be understood, however, that the possible relationships between a plasma display panel and a filter in accordance with the present invention is not limited to the embodiment disclosed in FIG. 1. If desired, the display panel 10 can be assembled with the filter 14 being an integral part of the panel 10. Alternatively, the panel 10 and filter 14 can be separate, stand alone items which are purchased separately. In such case, means may be provided for suspending the filter 14 from a portion of the panel 10 or connecting the filter 14 to the panel 10 so that the filter 14 is directly in front of and substantially adjacent to the display screen 11. It is also contemplated that the filter can be bonded or laminated directly to the display screen 11, if desired.

With continuing reference to FIG. 1, the filter 14 of the preferred embodiment includes a generally flat, planer filter lamination 15 having a view side 16 facing away from the display screen 11 and an opposite panel side 17 facing the display screen 11. The filter 14 further includes an electrically conductive element 18 in the form of a strip of conductive material applied to the peripheral edge of the filter lamination 15. As illustrated in FIG. 1, the electrically conductive material 18 of the preferred embodiment extends around the periphery of the lamination 15 and for a limited distance inwardly on both the view side 16 and the panel side 17. As will be described in greater detail below, the conductive element 18 functions in conjunction with electrically conductive layers within the lamination 15 to provide EMI and other shielding capability to the filter. Grounding means comprised of one or more grounding clips 19 with an electrical lead 20, or some other means, is commonly electrically connected with the conductor 18 for electrically connecting the conductor 18 to a ground terminal 21.

Figure 2:
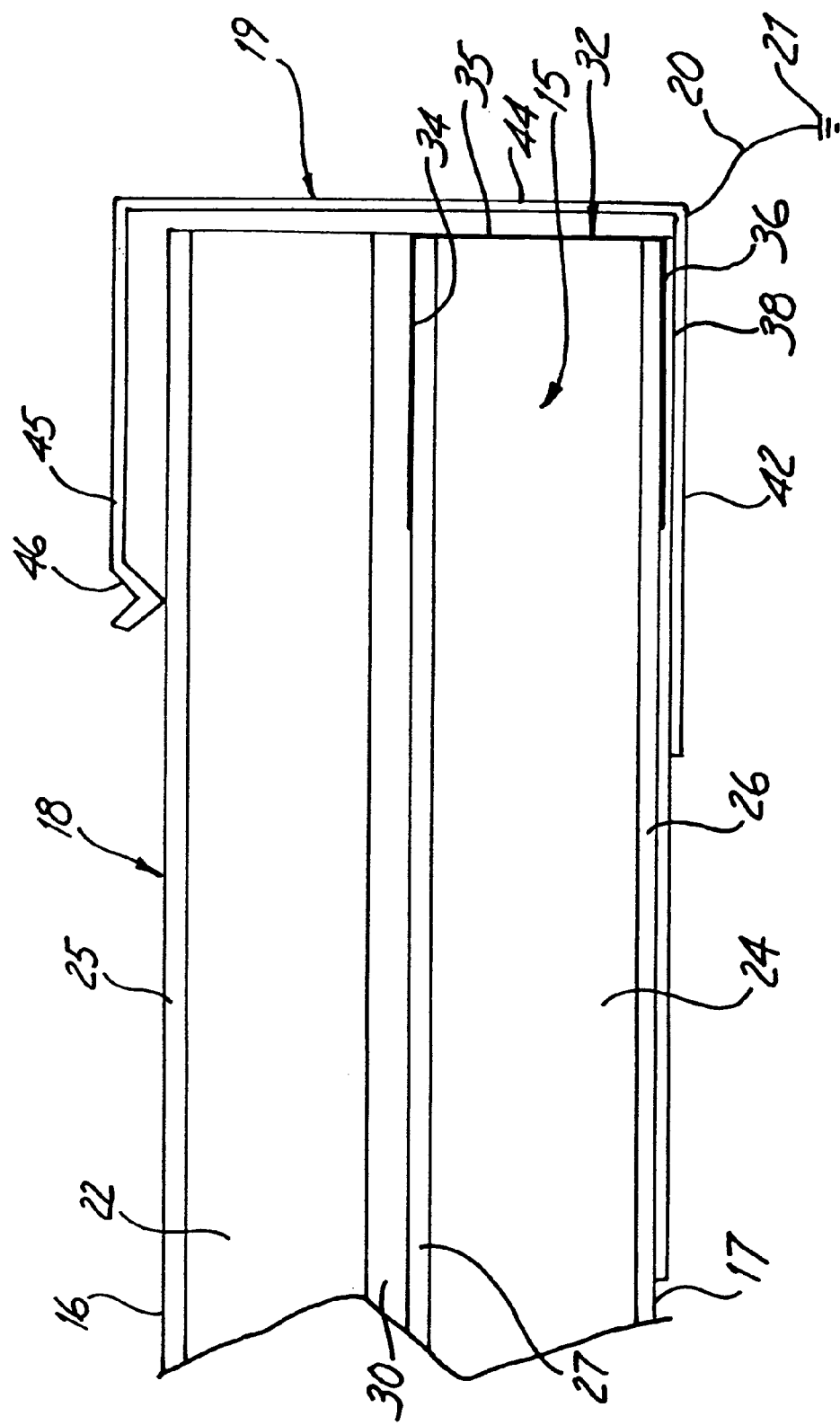
FIG. 2 is an enlarged view, partially in section, of one embodiment of a plasma display panel filter as viewed along the section line 2—2 of FIG. 1.

Reference is next made to FIG. 2 which is a partial sectional view of the filter lamination 15 as viewed along the section line 2—2 of FIG. 1. In general, the filter lamination 15 includes a pair of transparent substrates 22 and 24. In the preferred embodiment, the substrate 22 is the view side substrate and the substrate 24 is the panel side substrate. Each of the substrates 22 and 24 is provided with an anti-reflective coating 25 and 26, respectfully, which is applied to the outer surfaces of the substrates, namely, to the view side of the view side panel and the panel side of the panel side panel. An EMI/IR shielding film 27 comprised of a combination of dielectric and conductive layers is applied to the view side of the panel side substrate 24 and between the substrate 22 and 24 to reduce and limit EMI emissions and to provide infrared shielding and contrast enhancement. The film 27 is thus laminated between the substrates 22 and 24 via the adhesive or lamination layer 30 after being applied to the substrate 24 by sputtering.

In the preferred embodiment, the transparent substrates 22 and 24 are comprised of generally flat, planer sheets of glass. It is contemplated, however, that the transparent substrates 22 and 24 could, if desired, be constructed of a transparent plastic or other synthetic material or a composite glass/synthetic material. The thicknesses of the substrates 22 and 24 should be selected to be as thin as possible while still being thick enough to provide the necessary and desirable safety and strength characteristics. In the preferred embodiment, the thickness of the substrates is preferably in the range of about 1.0 mm to about 6.0 mm or less for a filter having a viewing surface of about 2–10 square feet. However, it is contemplated that at least one of the substrates 22,24 could also be a thin film synthetic material such as polyethylene terapthalate (PET) on the order of 0.010 inches thick, however, other film thickness would work as well. One of the substrates could also be the front face of a display device if the one substrate with film thereon is laminated directly to the display device.

The anti-reflective coating 25 applied to the view side of the substrate 22, is similar to the anti-reflective coating 26 applied to the panel side of the substrate 24, and can be any anti-reflective coating known in the art. Preferably, the anti-reflective coatings 25 and 26 in accordance with the present invention are comprised of a plurality of individual layers which are applied to the respective surfaces of the substrates 22 and 24 via sputtering or reactive sputtering in accordance with processes known in the art. The particular makeup of these anti-reflective coatings should be effective to reduce the photopic reflection from the view side 16 and panel side 17 of the filter 15 to an acceptable level. In a structure incorporating the filter of the present invention, the photopic reflection normally exhibited by the display screen 11 (FIG. 1) is significantly reduced, in some embodiments by as much as a factor of 10 or more, from a reflection of over 15% to a reflection of about 4 or 5% to 1.0% or less.

The specific structure of the anti-reflective coatings 25 and 26 is described in U.S. Pat. No. 5,372,874, the substance of which is incorporated herein by reference, and is currently sold by Viratec Thin Films, Inc. of Faribault, Minn. under the trademark CDAR. Other anti-reflective coatings, however, can also be used.

The film 27 is comprised of a combination of dielectric and conductive layers and is primarily designed to reduce the EMI and IR emissions to acceptable levels, while at the same time minimizing any adverse affect on the transmission of visible light through the filter. The film 27 is transparent and each of its dielectric and conductive layers is transparent. In the preferred embodiment, the film 27 is applied to the view side of the panel substrate 24 by sputtering or reactive sputtering and comprises a series of dielectric layers separated by layers of an electrically conductive material. Specifically, the film 27 includes four dielectric layers 50, 54, 58 and 61 and three interleaved electrically conductive layers 51, 55 and 59.

With reference to FIG. 3, the layers 50, 54, 58 and 61 are layers of relatively high refractive index dielectrics having a refractive index of at least 1.7 and preferably about 2.2 to 2.8. The layers 51, 55 and 59 are layers of electrically conductive materials such as conductive metals. In some film 27 structures, layers 52, 56 and 60 of a further metal or other material are added adjacent to the conductive layers 51, 55 and 59 to prevent oxidation of the conductive layers during deposition of the dielectric layers 54, 58 and 61.

The electrically conductive layers 51, 55 and 59 function primarily to reduce IR and EMI emissions generated in the plasma display panel. Preferably, EMI emissions are reduced to levels which comply with various governmental or other regulations or standards. In general, the thicker the conductive layers 51, 55 and 59, the more effective they are in reducing IR and EMI emissions. However, increasing the thickness of the conductive layers 51, 55 and 59 also lowers the transmission of visible light. Thus, to obtain the desired shielding capability, two or more, and preferably three, conductive layers of limited thickness are preferred. In the preferred embodiment, the conductive material layers 51, 55 and 59 are silver; however, various other conductive materials can be used as well including materials such as copper, gold and indium tin oxide, among others. Preferably, each of the layers 51, 55 and 59 has a thickness of about 5 mn to 20 nm and more preferably a thickness of about 10 nm to 15 nm. Most preferably, the thicknesses of the layers 51, 55 and 59 are 12 nm, 13 nm and 12 nm, respectively. The conductive layers are preferably applied by sputtering, reactive sputtering, or other thin film deposition techniques.

The dielectric layers 50, 54, 58 and 61 are high refractive index materials and function primarily to reduce reflectivity, and thus improve transmission of visible light in the regions of about 380 nm to 800 nm. In the preferred embodiment, the dielectric material of the layers 50, 54, 58 and 61 may include materials such as niobium pentoxide ($Nb_2O_5$), titanium dioxide ($TiO_2$) and tin oxide ($SnO_2$), among others. Preferably, however, the dielectric material is niobium pentoxide ($Nb_2O_5$).

The outer dielectric layers 50 and 61 have a preferred optical thickness of between about 0.4 to 0.8 at a wavelength of about 450 nm to 650 nm, while the inner dielectric layers 54 and 58 have an optical thickness between about 0.7 to 1.5 at a wavelength of about 450 nm to 650 nm. As used above and throughout this application, the term "optical thickness" shall mean the "quarter wave optical thickness" or QWOT as it is known in the art. Preferably, the. physical thickness of the outer layers 50 and 61 is about 20 nm to 50 nm and most preferably is about 30 nm to 40 nm. The physical thickness of the inner dielectric layers 54 and 58 is preferably about 50 nm to 90 nm and is most preferably about 60 nm to 70 nm.

In some structures where the film 27 is formed by sputtering or reactive sputtering, the various film layers and the conductive material is reactive to one or more of the materials making up the adjacent layer. In such cases, it is necessary to first provide a thin protective or sacrificial material layer next to the conductive material layer to prevent its oxidation or other reaction to the reactive materials of the dielectric layers. In the embodiment of FIG. 3, the layers 52, 56 and 60 perform such a function. In the preferred structure of FIG. 3, a thin layer of titanium or some other sacrificial material is applied adjacent to the conductive material layer so that when the $Nb_2O_5$ or other dielectric material is applied by sputtering or reactive sputtering, the oxygen oxidizes the titanium layer 52, 56 and 60 to $TiO_2$ rather than the conductive layer 51, 55 and 59. The oxidized titanium layer then forms part of the adjacent dielectric layer. In the preferred embodiment, the thickness of the protective layers 52, 56 and 60 are about 0.5 nm to 5 nm and most preferably about 3 nm to 5 nm.

The preferred embodiment of the film 27 is a seven layer film comprising three conductive material layers and four dielectric material layers. It is contemplated, however, that films with different total layers can also be utilized. Preferably, however, the number of dielectric layers should exceed the number of conductive layers by one. Thus, where n equals the number of conductive layers, the number of dielectric layers is preferably n+1.

Accordingly, the film 27 of FIG. 2 comprises a plurality of conductive and dielectric layers including a pair of end dielectric layers and alternating conductive and inner dielectric layers disposed therebetween. The end dielectric layers have an optical thickness of between about 0.4 to 0.8 and preferably 0.6 at a wavelength of about 450 nm to 650 nm, the inner dielectric layers have an optical thickness of about 0.7 to 1.5 at a wavelength of about 450 nm to 650 nm and the conductive layers have a physical thickness of about 5 nm to 15 nm.

In the embodiment of FIG. 2, the film 27 is applied by sputtering the various film layers to the view side of the panel side or film carrying substrate 24, with the layer 50 sputtered first and then followed by the layer 51, the layer 52 and sequentially by the layers 54, 55, 56, 58, 59, 60 and 61. The film carrying substrate 24 is then laminated to the substrate 22 via the adhesive or lamination layer 30, with the film 27 facing the substrate 22. The lamination material 30 in the preferred embodiment comprises a sheet of polyurethane adhesive. As shown, the adhesive sheet. 30 is positioned between the film 27 and the panel side of the substrate 22. Many adhesives or laminations such as PVB, acrylic and/or others can, of course, be used to laminate the substrates 22 and 24 together; however, the particular adhesive or lamination materials selected should be capable of exhibiting substantially transparent properties upon completion of the lamination. The adhesives may also be tinted or otherwise be provided with IR shielding capabilities, if desired. In accordance with the present invention, the layer 30 is positioned between the substrates 22 and 24 as shown and then placed in an autoclave under appropriate heat and pressure conditions for approximately three to four hours to laminate the layers together.

A further embodiment of the filter in accordance with the present invention is shown in FIG. 6. FIG. 6 is similar to the embodiment of FIG. 3 except that it illustrates a modified film 27'. The film 27' of FIG. 6 differs from the film 27 of FIG. 3 in two respects: First, the film 27' includes additional protective or sacrificial layers 53a, 53b and 53c adjacent to the layers 52, 56 and 60, respectively, and second, an additional layer 57 is applied over the outer dielectric layer 61 so that when the substrates are laminated together, the layer 57 is positioned between the dielectric layer 61 and the adhesive 30.

As discussed above with respect to the embodiment of FIG. 3, the protective or sacrificial layers 52, 56 and 60 are preferably titanium. The reasons, among possible others, are that titanium is easily oxidized and when oxidized, the resulting titanium oxide is clear. As also disclosed above with respect to the embodiment of FIG. 3, the dielectric layers 50, 54 and 58 and 61 are preferably niobium pentoxide ($Nb_2O_5$). The reasons, among possible others, are that niobium pentoxide has a high sputter rate and lower optical dispersion. Despite the distinct advantages of using titanium and niobium pentoxide as the sacrificial layer and the dielectric layers, respectively, certain disadvantages or limitations exist when they are used adjacent to one another or when the conductive material is highly reactive and multiple layers are necessary. These disadvantages are believed to arise from two primary factors. First, the relatively high plasma energy and deposition temperature of niobium pentoxide adversely affects the protective ability of the titanium. Thus, when both niobium pentoxide and titanium are used as in the preferred embodiment, it is necessary to increase the thickness of the sacrificial titanium layers in order to fully protect the underlying conductive layers (51, 55 or 59) from being oxidized or otherwise damaged during application of the niobium pentoxide. Second, the oxidation of titanium metal is an exothermic reaction. Because more protective titanium is needed when it is oxidized in the presence of niobium pentoxide, the level of heat caused by the exothermic reaction increases significantly. Because excess heat causes silver to agglomerate, excessive oxidation of titanium can result in damage to the underlying silver conductive layer.

To prevent, or at least minimize, the disadvantages associated with adjacent layers of titanium and niobium pentoxide as described above, and to thereby facilitate the use of both titanium and niobium in the filter of the present invention, a thin layer of a further protective material 53a, 53b and 53c is applied to the titanium layers 52, 56 and 60 as shown in the embodiment of FIG. 6. Preferably these layers 53a, 53b, 53c are tin oxide which is more durable than titanium and the underlying silver and which exhibits a significantly reduced difference in plasma energy level and deposition temperature relative to niobium pentoxide. Other materials such as $ZnO_2$ and $SiO_2$, among others, may also be used provided they are more durable than titanium and exhibit a reduced plasma energy level and deposition temperature, compared to niobium pentoxide. In the embodiment of FIG. 6, the layers 52, 56 and 60 are preferably about 0.5 nm to 15 nm thick and most preferably about 3 nm to 5 nm thick, while the layers 53a, 53b and 53c are preferably about 5 nm to 40 nm thick and most preferably about 10 nm to 30 nm thick.

For the same reasons as discussed above, niobium pentoxide is the preferred dielectric for the layers 50, 54, 58 and 61, including the outer dielectric layer 61. Despite being preferred, however, strength of adhesion between the niobium pentoxide outer layer 61 and many of the adhesives is less than desired. To overcome these limitations, the embodiment of FIG. 6 provides a thin layer 57 of silicon dioxide ($SiO_2$) or other adhesive compatible layer on the outer surface of the outer dielectric layer 61 so that when the substrates 22 and 24 are laminated together with an adhesive 30, the layer 57 is positioned between the layer 61 and the adhesive 30.

This additional layer 57 improves the adhesive bond between the coated substrate 24 and the substrate 22 and thus acts as an adhesion promoter and also limits any possible reaction between the dielectric and the adhesive. Preferably this layer is silicon dioxide or some other silicon based composition. However, other materials or compositions will work as well. The layer 57 is preferably about 2 nm to 50 nm thick and more preferably about 10 nm to 30 nm thick.

Both the film 27 of FIGS. 2 and 4 and the film 27' of FIG. 6 provide sufficient sheet resistance to reduce EMI emissions to acceptable levels. Preferably, the films 27 and 27' function to exhibit sheet resistance of less than 5 ohms per square and more preferably less than 1.5 ohms, per square. The films 27 and 27' also are designed to block IR emissions and thus reduce the same to acceptable levels, to optically match the adhesive used to laminate the second substrate and to generally provide desired optical performance by reducing reflection and improving contrast enhancement.

During assembly of the filter lamination 15, a busbar 32 is applied to the outer peripheral edge portion of the substrate 24. Preferably this busbar includes a first leg 34 electrically contacting the film 27 and extending inwardly from the outer peripheral edge of the substrate 24, a second leg 36 applied over the anti-reflective coating 26 and also extending inwardly from the outer peripheral edge of the substrate 24 and a third leg 35 electrically connected with the legs 34 and 36 and essentially extending over the entire peripheral edge of the substrate 24. If desired, the legs 35 and 36 can be eliminated as shown in FIG. 4.

In the preferred embodiment, the legs 34 and 36 extend inwardly from the peripheral edge of the substrate 24 for a distance of at least 1.0 mm and preferably a distance greater than or about 2.0 mm. Further, the busbar 32 in accordance with the present invention preferably extends around the entire periphery of the substrate 24 and thus the film 27. It is contemplated that the busbar 32 can be applied in a variety of ways. In the preferred embodiment, however, the busbar 32 is a solder based, electrically conductive material applied via ultrasonic soldering.

Following application of the busbar 32 to the peripheral edge portion of the substrate 24, a conductive environmental degradation barrier member 38 in the form of electromagnetic shielding tape is applied over the leg portion 35 of the busbar 32. The member 38 is applied to the outer or panel side of the anti-reflective coating 26 along the outer peripheral edge of such coating 26. The member 38 extends inwardly a limited distance from the outermost peripheral edge of the coating 26. This limited distance is greater than 5 mm and preferably equal to or greater than about 9 mm. If desired, the barrier member 38 can be applied to all three legs 34, 35 and 36 of the buss bar 32. The member 38 is preferably applied to and connected with leg 35 of the busbar 32 by an electrically conductive adhesive. Accordingly, the member 38 serves the primary function of making an electrical connection with the busbar 32 via the electrically conductive adhesive.

Grounding means is also provided for electrically connecting the member 38, and thus the busbar 32 and the conductive layers 51, 55 and 59, to a grounding terminal 21. In one embodiment as shown in FIGS. 1, 2, 4 and 5, this means is in the form of a grounding clip 19 having a first leg 42 engaging the member 38, a second leg 45 with a spring contact member 46 for making electrical contact with the coating 25 of the substrate 22, and a third leg 44 joining the legs 42 and 45. An electrical lead 20 has one end connected to the connector clip 19 and a second end connected with the grounding terminal 21. Other means can of course also be provided for making this electrical grounding connection.

FIG. 4 shows an alternate embodiment for connecting the busbar 32 to the film 27 and connecting the member or tape 38 to the busbar 32. As shown in FIG. 4, the busbar is comprised only of the leg 34, with the legs 35 and 36 having been eliminated. In this embodiment a leg 41 of the tape 38 is provided directly over the busbar leg 34, with the legs 40 and 39 of the tape 38 covering the end and a portion of the face, respectively, of the substrate 24. In his embodiment, both the busbar and the tape would be applied to the substrate 24 before lamination to the substrate 22.

The method aspect of the present invention, including the method of forming the filter film on a first substrate and subsequently laminating the same to a second substrate can be understood as follows. First, a transparent substrate preferably of glass or plastic is provided. If desired, the non-coated side surface of such substrate can be provided with an anti-reflective coating by sputtering or other deposition technologies. In some cases this ultimately may be the view side, while in other cases it may ultimately be the panel side.

Following this, the film 27 (FIG. 3) or the film 27' (FIG. 6) comprised of the plurality of dielectric and conductive layers is applied to the side of the substrate opposite to the anti-reflective coating. If no anti-reflective coating is applied, the film 27 or 27' can be applied to either surface. Preferably, the film 27 or 27' and its individual layers are applied by sputtering as previously described. Although the preferred embodiment shows the film 27 or 27' being applied directly to the substrate surface, one or more intermediate layers of a further material may also be applied to the substrate prior to application of the film. Next, for the embodiment of FIG. 2, the busbar 32 is applied to the entire peripheral edge portion of the film coated substrate 24. Preferably the legs of the busbar are applied in stages with the leg 34 first applied to the outer edges of the film 27 or 27' and the leg 35 applied to the outer peripheral edge of the substrate 24. In the embodiment of FIG. 4, the busbar is applied only in the form of the leg 34 and the tape or member 38 is then applied to the substrate.

The film coated substrate is then preferably laminated to a second substrate 22 which may also be provided with an AR coating, either before or after lamination. The lamination is preferably accomplished by positioning the adhesive sheet 30 between the side of the substrate 22 opposite the AR coating 25 and the side of the substrate 24 carrying the film 27 or 27'. The entire lamination lay-up is then placed in an autoclave under appropriately elevated heat and pressure conditions to laminate the lay-up together. In the preferred procedure, the lamination lay-up is exposed to a temperature of approximately 220° F. and a pressure of approximately 40 p.s.i. for about three hours. Alternatively, the film coated substrate 24 can be applied to a plastic film such as PET film or directly to the front face of a display device.

When the lamination is complete, the conductive member or tape 38 is applied to the outer peripheral edge portions of the filter 15 as illustrated in FIG. 2. The grounding clip 19 is then applied to the member 38 as shown.

In the embodiment of FIG. 5, the EMI/IR filter is provided by the layers 28 and 29. Specifically, a conductive EMI shielding material layer 28 is applied to the panel or inner side of the substrate 22 to reduce and limit EMI emissions and an infrared absorbing layer 29 is laminated between the substrates 22 and 24 via the adhesive or lamination layers 33 and 31.

In the embodiment of FIG. 5, the electrically conductive material layer 28 is applied to the panel side of the substrate 22 as shown. Although this layer 28 can be constructed of a variety of materials, it must preferably include an electrically conductive component or layer which provides sufficient electrical conductivity, and thus sufficiently low electrical resistance, while still maintaining acceptable visible light transmission. Preferably, the conductive layer 28 exhibits sheet resistance of less than 5 ohms per square and more preferably less than 1.5 ohms per square. The layer 28 provides electromagnetic interference (EMI) shielding and assists in reducing EMI emissions to levels which comply with consumer safety and other regulations and standards. The layer 28 also provides an IR shielding function as well to assist in reducing infrared emissions to acceptable levels.

Preferably the conductive layer 28 extends over the entire panel side of the substrate 22. This layer 28 can, if desired, comprise a single layer of an electrically conductive material such as silver or indium tin oxide (ITO) and can also comprise additional layers and materials such as other metals and materials which may be conductive as well as dielectrics and materials which may not be conductive. Such additional layers and materials can be provided to assist in infrared shielding and reduction of reflection as well as to provide contrast enhancement to the filter. This may be accomplished by introducing color or tint into the coating.

The layer 28 in the present invention can be applied to the substrate 22 by any known means. Preferably, however, the layer or layers which form the electrically conductive material layer 28 is applied by sputtering or reactive sputtering one or more metals such as silver, gold or copper. The thickness of the layer 28 should preferably be in the range of less than 2500 Å and most preferably in the range of 2000–2500 Å.

The layer 29 comprises an infrared absorbing film which is a separate, free-standing film and is sandwiched between, and laminated to, the substrates 22 an 24 by the lamination material 33 and 31. The film 29 can comprise any film which functions to provide near infrared absorbing capability such as dyed polyethylene terapthalate (PET) or dyed polyurethane. In the preferred embodiment, the film thickness ranges from 5–10 mils and further includes contrast enhancement capability. The film 29 is effective to reduce the infrared transmission in the 800 nm–1000 nm range to a level preferably less than 20%. At these reduced levels, interference with infrared remote control transmitters either for the panel display in question or other remote control devices is eliminated.

The lamination materials 33 and 31 in the preferred embodiment comprise sheets of polyurethane adhesive. As shown, one adhesive sheet 33 is positioned between the film 29 and the coating 28, while the other polyurethane adhesive sheet 31 is positioned between the film 29 and the view side of the substrate 24. Many adhesives or laminations such as PVB, acrylic and/or others can, of course, be used to laminate the film 29 between the coated substrates 22 and 24; however, the particular adhesive or lamination materials selected should be capable of exhibiting transparent properties upon completion of the lamination. The adhesives may also be tinted or otherwise be provided with IR absorbing or shielding capabilities. Preferably, the layers 29, 33 and 31 are positioned between the substrates 22 and 24 as shown and then are placed in an autoclave under appropriate heat and pressure conditions for approximately four hours to laminate the layers together.

Alternative methods of applying the layer 29 may also be utilized. For example, a recently introduced technique involves positioning the coated substrates 22 and 24 in spaced relationship and sealing the edges so as to form a cavity for accommodating an infrared shielding or absorbing material between the spaced substrates. A liquid or flowable material such as an acrylic into which infrared shielding material is incorporated is then introduced into the space between the substrates so that it flows over the entire substrate surfaces. This material is then allowed to cure via ultraviolet exposure or otherwise to produce the infrared absorbing layer.

The method aspect of the present invention relating to the embodiment of FIG. 5, including the method of making the plasma display panel filter, can be understood as follows. First, a pair of transparent substrates such as glass or plastic are provided. One of these substrates will ultimately form the view side substrate 22 positioned on the view side of the filter, while the other substrate will ultimately form the panel side substrate 24. Both of these substrates 22 and 24 are provided with anti-reflective coatings 25 and 26, respectively by sputtering.

Following this, the EMI shielding layer in the form of the electrically conductive coating 28 is also applied to the panel side of the substrate 22. Preferably, this coating is also applied by sputtering. Next, the busbar 32 is applied to the entire peripheral edge portion of the substrate 22. Preferably the legs of the busbar are applied in stages with the leg 34 first applied to the outer edges of the coating 28 and the leg 35 applied to the outer peripheral edge of the substrate 22.

The film 29 is then laminated between the coated substrates 22 and 24 by positioning one adhesive sheet 33 between the film 29 and the conductive coating 28 of the substrate 22 and a second adhesive lamination sheet 31 between the other side of the film 29 and the view side of the substrate 24. The entire lamination lay-up is then placed in an autoclave under appropriately elevated heat and pressure conditions to laminate the lay-up together. In one procedure, the lamination lay-up is exposed to a temperature of approximately 220° F. and a pressure of approximately 150 p.s.i. for about four hours.

When the lamination is complete, the conductive member 38, comprised of the legs 39, 40 and 41, is applied to the outer peripheral edge portions of the filter 15 as illustrated in FIG. 5. The grounding clip 19 is then applied to the member 38 as shown.

Although the description of the preferred embodiment and method have been quite specific, it is contemplated that various modifications may be made without deviating from the—spirit of the present invention. For example, although the preferred embodiment has been described with respect to a plasma display device, certain features have broader applications. For example, the additional protective layer for the silver or other conductive material may have applications for other than display devices. In general, any application where oxidation or other deterioration of the conductive layer is a concern, can use this feature of the invention. Accordingly, it is intended that the scope of the present invention be dictated by the appended claims rather than by the description of the preferred embodiment and method.

What is claimed is:

1. An optical filter comprising:

a transparent substrate having first and second sides; and a multi-layer film applied to one of said first and second sides, said film comprising at least one electrically conductive layer, at least one dielectric layer comprised of niobium pentoxide and a protective layer positioned between said dielectric layer and said electrically conductive layer, said protective layer comprising a first layer of oxidized titanium and a second layer of a material having a plasma energy level less than niobium pentoxide.

2. The optical filter of claim 1 wherein said second layer is tin oxide.

3. The optical filter of claim 2 wherein said oxidized titanium is adjacent to said electrically conductive layer and said tin oxide is adjacent to said dielectric layer.

4. The optical filter of claim 3 wherein said electrically conductive layer is silver.

5. The optical filter of claim 4 including a plurality of electrically conductive layers and a plurality of dielectric layers alternating with said electrically conductive layers.

6. The optical filter of claim 1 including a plurality of electrically conductive layers and a plurality of dielectric layers alternating with said electrically conductive layers.

7. A multilayer optical film applied directly or indirectly to a substrate comprising:
a plurality of dielectric layers each having a surface facing the substrate and a surface facing away from the substrate;
a conductive material layer between adjacent ones of each of said dielectric layers, said conductive material layer having a surface facing the substrate and a surface facing away from the substrate;
layers of first and second protective materials applied between the surface of said conductive material layer facing away from the substrate and an adjacent surface of one of said dielectric layers facing the substrate, said layer of first protective material applied adjacent to said surface of said conductive material layer facing away from the substrate and said layer of second protective material applied between said first layer of protective material and said adjacent surface of said dielectric layer facing the substrate, and said one dielectric having a refractive index of about 1.7 to 2.2 and an optical thickness of at least about 0.4 at a wavelength of about 450 nm to 650 nm.

8. A multilayer optical film applied directly or indirectly to a substrate comprising:
a plurality of dielectric layers each having a surface facing the substrate and a surface facing away from the substrate wherein at least one of said dielectric layers is niobium pentoxide;
a conductive material layer between adjacent ones of each of said dielectric layers, said conductive material layer having a surface facing the substrate and a surface facing away from the substrate.

9. The optical film of claim 7 wherein said first protective material is oxidized titanium and is adjacent to said one conductive material layer.

10. The optical film of claim 9 wherein said second protective material layer is one or more of tin oxide ($SnO_2$), zinc oxide ($ZnO_2$) and a silicone dioxide ($SiO_2$).

11. The optical film of claim 9 wherein said oxidized titanium is adjacent to said electrically conductive layer and said second protective material is tin oxide which is adjacent to said dielectric layer.

12. The optical film of claim 11 wherein said conductive material layer is silver.

13. The optical film of claim 12 including a plurality of electrically conductive layers and a plurality of dielectric layers alternating with said electrically conductive layers.

14. The optical film of claim 7 comprising:
a first dielectric layer applied to said substrate;
one or more second dielectric layers positioned further from the substrate than said first dielectric layer;
a third dielectric layer positioned furthest from the substrate;
a conductive material layer between each of said one or more dielectrics, between said first dielectric layer and a second dielectric layer and between said third dielectric layer and a second dielectric layer.

15. The optical film of claim 14 wherein said first and third dielectric layers have an optical thickness of between about 0.4 and 0.8 at a wavelength of about 450 nm to 650 nm, said one or more second dielectric layers each having an optical thickness of between about 0.7 and 1.5 at a wavelength of about 450 nm to 650 nm and said conductive material layers each having a thickness of about 5 nm to 20 nm.

16. A method of making an optical filter comprising the steps of:
providing a transparent substrate having a first side and a second side;
applying a multi-layer film to one of said first and second sides of said transparent substrate, said film comprising at least one electrically conductive layer, at least one dielectric layer, and at least one protective layer comprising first and second layers between said electrically conductive layer and said dielectric layer wherein said first layer is adjacent to said conductive layer and wherein second dielectric layer having a refractive index of about 1.7 to 2.2 and an optical thickness of at least about 0.4 at a wavelength of about 450 nm to 650 nm, the application step including applying an electrically conductive layer to said one side of said first transparent substrate or a dielectric layer, applying said first layer to said electrically conductive layer, applying said second layer to said first layer and applying said dielectric layer to said second layer.

17. A method of making an optical filter comprising the steps of:
providing a transparent substrate having a first side and a second side;
applying a multi-layer film to one of said first and second sides of said transparent substrate, said film comprising at least one electrically conductive layer, at least one dielectric layer, wherein said dielectric layer is niobium pentoxide, and at least one protective layer comprising first and second layers between said electrically conductive layer and said dielectric layer wherein said first layer is titanium, the application step including applying an electrically conductive layer to said one side of said first transparent substrate or a dielectric layer, applying said first layer to said electrically conductive layer, applying said second layer to said first layer and applying said dielectric layer to said second layer.

18. The method of claim 17 wherein said second layer is a material having a plasma energy level less than niobium pentoxide.

19. The method of claim 18 wherein said electrically conductive layer is silver.

20. The method of claim 16 including applying an anti-reflective coating to said second side of said transparent substrate.

21. The method of claim 16 wherein said transparent substrate is a first substrate and the method includes laminating said first substrate to a second transparent substrate.

22. The method of claim 16 wherein said transparent substrate is a first substrate and the method further includes:
providing a second transparent substrate having a first side and a second side;
applying an adhesive compatible layer to said dielectric layer to define an outer surface of said film; and
laminating said first and second transparent substrates together with an adhesive with said one side of said first transparent substrate facing said first side of said second transparent substrate and with said adhesive positioned between said second transparent substrate and said adhesive compatible layer.

23. The method of claim 22 wherein said adhesive compatible layer is a silicon based composition.

24. The method of claim 23 wherein said dielectric is niobium pentoxide and said adhesive compatible layer is silicon dioxide.

25. The method of claim 16 wherein said film is applied by sputtering.

26. A component of an optical film comprised of
a layer of a conductive material;
a layer of oxidized titanium applied to said conductive material layer;
a layer of one of tin oxide, zinc oxide and silicon dioxide applied to said oxidized titanium layer and
a dielectric material layer applied to said layer of one of said tin oxide, zinc oxide and silicon dioxide wherein said dielectric layer has a refractive index of about 1.7 to 2.2 and an optical thickness of at least about 0.4 at a wavelength of about 450 nm to 650 nm.

* * * * *